(12) United States Patent
Smets

(10) Patent No.: US 6,293,000 B1
(45) Date of Patent: Sep. 25, 2001

(54) TABLE SAW CONSTRUCTION FOR DISMANTLING OF PALLETS

(75) Inventor: Robert D. Smets, West Linn, OR (US)

(73) Assignee: Smetco, Inc., Aurora, OR (US)

( * ) Notice: Subject to any disclaimer, the term of this patent is extended or adjusted under 35 U.S.C. 154(b) by 0 days.

(21) Appl. No.: 09/497,275

(22) Filed: Feb. 1, 2000

(51) Int. Cl.[7] .............................. B23P 19/04; B26D 7/06; B27B 13/00; B27M 3/00
(52) U.S. Cl. ............................ 29/564.3; 83/810; 83/813; 83/439; 83/443; 83/445; 83/468.1; 83/943
(58) Field of Search ............................ 83/810, 813, 943, 83/443, 445, 439, 467.1, 468.1, 471, 485, 486; 29/426.4, 564.3; 269/297, 304, 309

(56) References Cited

U.S. PATENT DOCUMENTS

| | | | |
|---|---|---|---|
| 616,347 | * | 12/1898 | Oswald .............................. 269/309 X |
| 1,490,172 | * | 4/1924 | Hurrel .............................. 83/468.1 X |
| 1,544,878 | * | 7/1925 | Ashley .............................. 269/309 X |
| 2,180,604 | * | 11/1939 | Morris ................................ 83/439 X |
| 3,034,546 | * | 5/1962 | Parsons .............................. 269/309 X |
| 4,191,295 | * | 3/1980 | Tams, III .......................... 269/297 X |
| 4,320,570 | * | 3/1982 | Williams .............................. 29/564.3 |
| 4,391,173 | * | 7/1983 | Anderson ........................... 83/813 X |
| 4,415,149 | * | 11/1983 | Rees .................................. 269/297 X |
| 4,492,016 | * | 1/1985 | Smets et al. ........................... 29/432 |
| 4,757,599 | * | 7/1988 | Bane ................................... 29/564.3 |
| 5,600,882 | * | 2/1997 | Beane .............................. 29/426.4 X |
| 5,865,080 | * | 2/1999 | Jackson .............................. 83/443 X |

OTHER PUBLICATIONS

Advertisement, *Pallet Enterprise*, p. 17, Nov. 1999—Heartland deluxe Saw.
Advertisement, *Pallet Enterprise*, p. 29, Nov. 1999—Alpine bandsaw.
Advertisement, *Pallet Enterprise*, p. 57, Nov. 1999—Upgrade Systems bandsaw.
Advertisement, *Pallet Enterprise*, p. 72, Nov. 1999—The MSI Cut & Go Bandsaw.
Advertisement, *Pallet Enterprise*, p. 92, Nov. 1999—Trading Post bandsaw.
Advertisement, *Pallet Enterprise*, p. 16, Feb. 2000—JB & Co. bandsaw.
Advertisement, *Pallet Enterprise*, p. 13, May 2000—Valley Saw bandsaw.
Advertisement, *Pallet Enterprise*, p. 66, May 2000—Smart Products bandsaw.
Advertisement, *Pallet Enterprise*, p. 77, May 2000—Prosaw bandsaw.
Advertisement, *Pallet Enterprise*, p. 78, May 2000—PDI bandsaw.

* cited by examiner

*Primary Examiner*—Rinaldi I. Rada
*Assistant Examiner*—Charles Goodman
(74) *Attorney, Agent, or Firm*—Klarquist Sparkman, LLP

(57) ABSTRACT

A table saw for use in dismantling wood pallets is provided with a table and band saw blade having course over table to cut nails between face boards and stringers as pallet is moved through blade. Table has convex, arcuate fence about which pallet may be twisted to facilitate cutting of nails. Table is shiftable horizontally relative to the saw blade to adjust position for use by single operator with short pallets or two operators with long pallets.

6 Claims, 4 Drawing Sheets

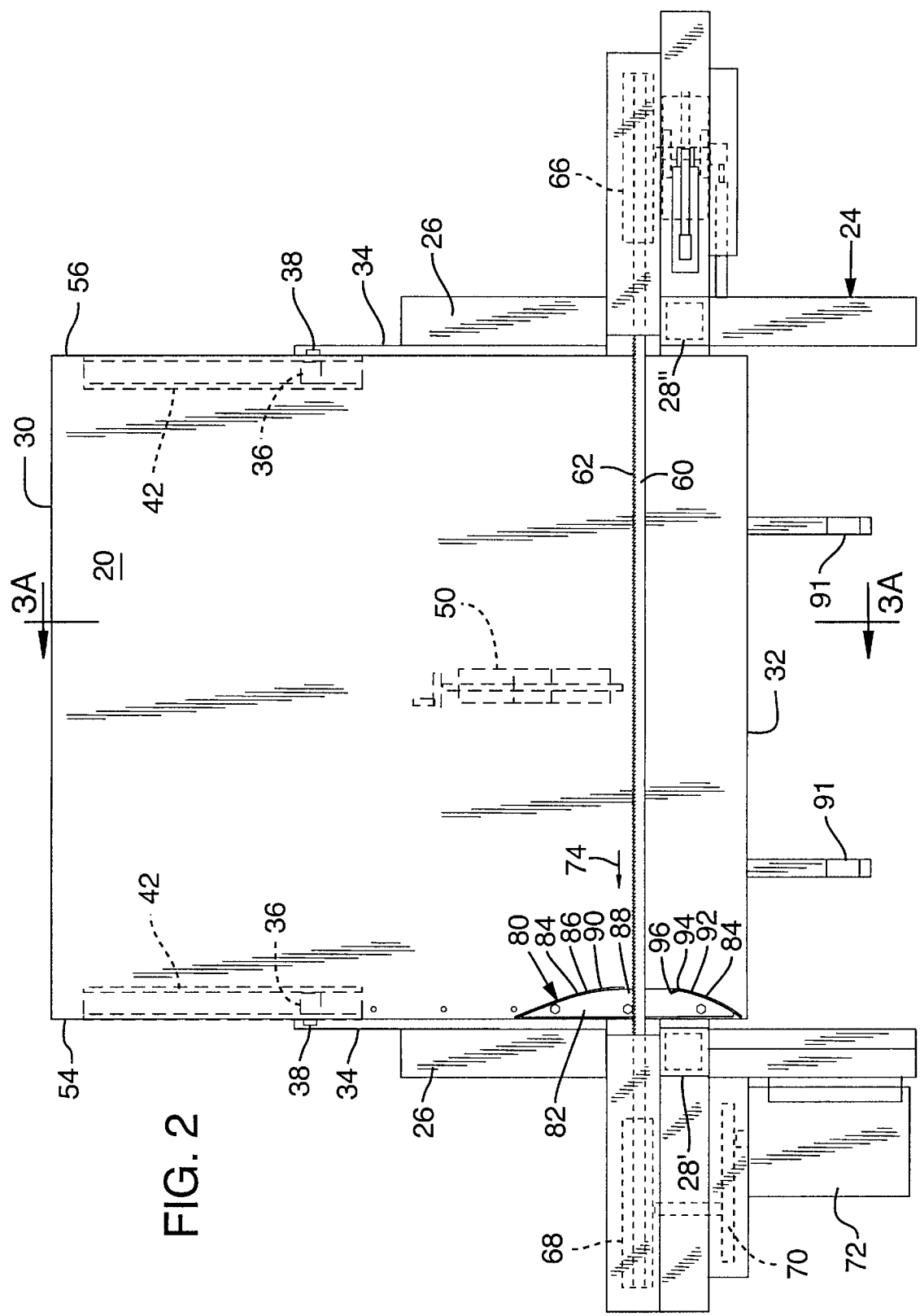

US 6,293,000 B1

TABLE SAW CONSTRUCTION FOR DISMANTLING OF PALLETS

FIELD OF INVENTION

This invention pertains to improvements in a table saw for use in dismantling of wood pallets.

BACKGROUND OF THE INVENTION

Wood pallets comprising face boards secured to the opposite edges of stringers used for the storing, shipping and handling of goods frequently are damaged in part, but contain reusable portions. The face boards are attached usually by nails to the top and bottom edges of the stringers. The stringers in some pallets are replaced at least in part by blocks of wood or similar material, but in either case, the pallet is provided with opposite rows of substantially parallel face boards so that the pallets can be stacked one on the other, or placed on a horizontal surface, with the upper surface of a pallet carrying a load. Table saws have been provided heretofore which incorporate a flat table surface upon which a damaged pallet to be dismantled can be supported, and moved through a band saw to effect cutting of the nails or other fasteners holding the face boards to the stringers. Because pallets are irregular in size and configuration, they are generally moved across the table and past the saw blade manually. Because of the irregularities and distortions, binding of the blade frequently occurs and it is necessary for the saw operator frequently to twist the pallet from one position to another to facilitate its movement through the saw.

It is a principal object of the present invention to provide an improved table saw apparatus to facilitate the cutting of nails that connect the face boards of a pallet to the stringers and expedite and reduce the time and effort required to dismantle a pallet.

More particularly, it is an object to provide improvements to a table saw that facilitate the maneuvering of a pallet as it is moved through a saw so as to increase the rate at which pallets can be dismantled.

It is another object to provide a table saw that can be easily modified for operation by one man or alternatively by two men in processing larger pallets.

Other objects and advantages will become apparent hereinafter.

SUMMARY OF THE INVENTION

In accordance with the invention, a table saw is provided, having a substantially horizontal table upon which pallets to be dismantled may be supported upon the face boards of a pallet. Extending across the top of the table is the upper course of a band saw blade which is positioned above the table at a height substantially equal to the thickness of a face board so that as a pallet on the table is moved through the blade, the blade will sever the fasteners holding the face boards to the stringers of the pallet with minimum removal of material from either the face boards or the stringers. A fence is positioned along one edge of the table surface, the fence comprising a convexly curved surface portion facing towards the direction of movement of saw blade, that is with the saw blade moving towards the fence, the apex of the curved surface being substantially aligned with the cutting edge of the saw blade. The configuration of the fence facilitates the ability of the operator manually pushing or pulling a pallet through the saw to shift the position of the pallet to expedite the cutting action of the saw blade.

In accordance with a modification of the invention, the table is constructed to permit shifting of the position of the table in the direction normal to the movement of the saw blade, to facilitate the handling of pallets by one operator or two operators.

BRIEF DESCRIPTION OF THE DRAWINGS

FIG. 2 is a top plan view of the saw of FIG. 1.

DETAILED DESCRIPTION OF THE INVENTION

Figure 1:
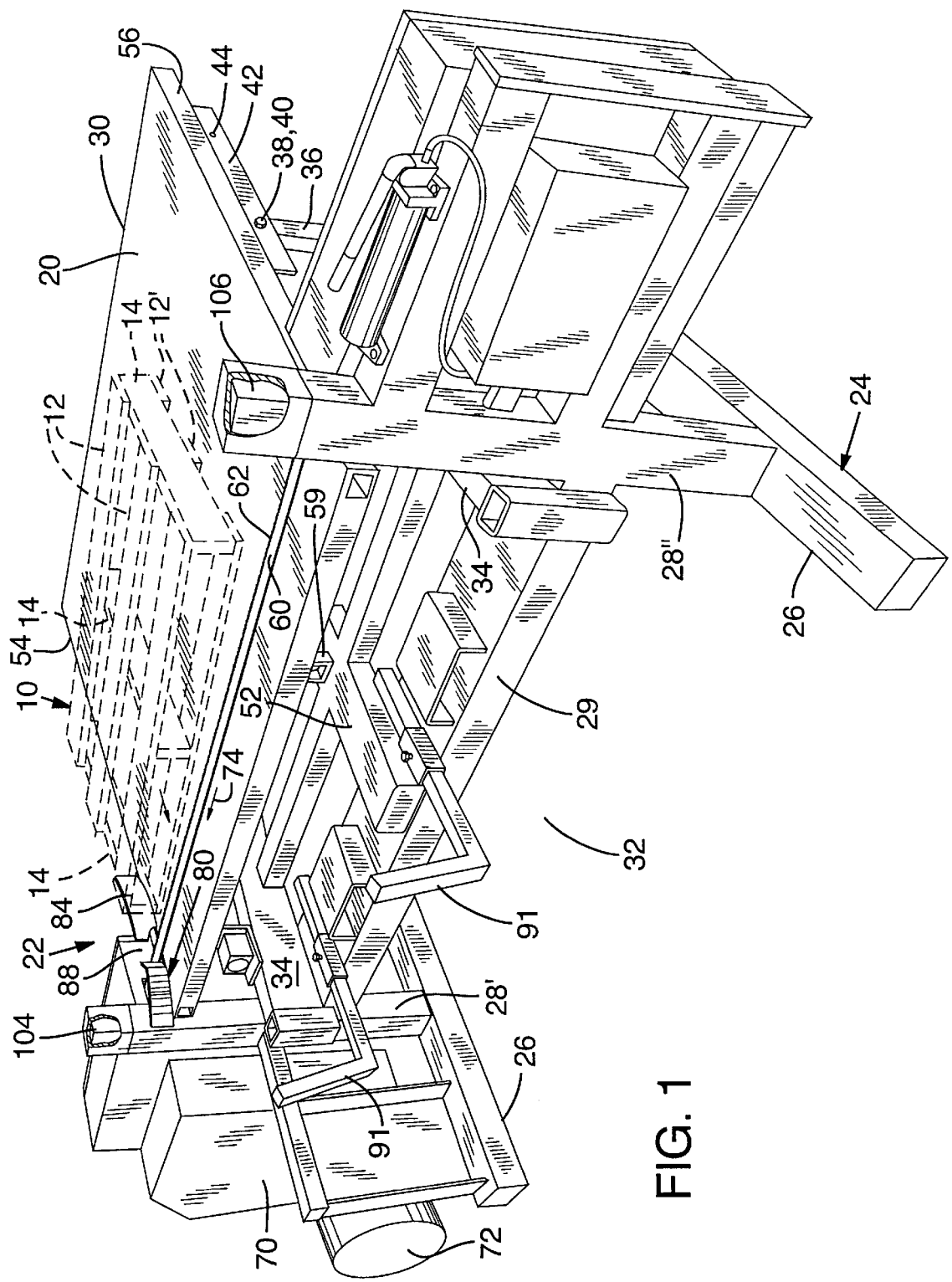
FIG. 1 is a perspective view of a table saw constructed in accordance with the invention, showing in dotted lines, a pallet positioned upon the saw table for advancement through the saw to sever the fasteners securing the bottom row of face boards to the stringers of the pallet, the table being in position for a single operator to pull pallets through the saw from the discharge end of the table.

Referring first to FIG. 1, there is shown therein in dotted lines a typical pallet 10 consisting of a plurality of top face boards 12 and bottom face boards 12' attached to the top and bottom edges, respectively, of stringers 14 by suitable fasteners, usually nails, but which can be screws, staples or other suitable metal fasteners (not shown).

Figure 3A:
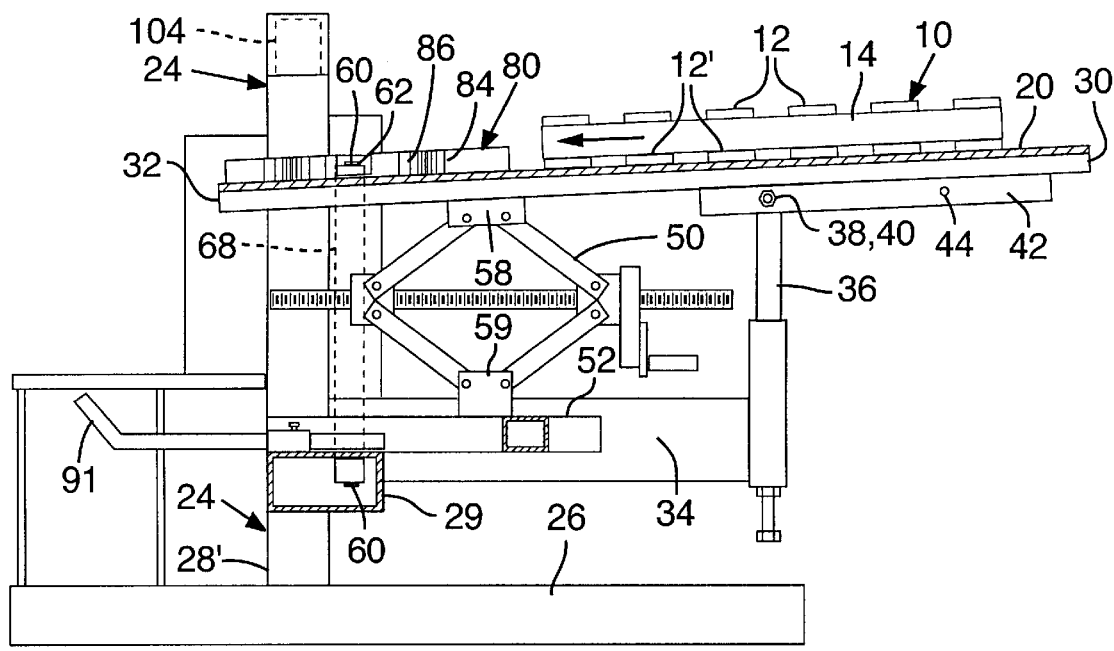
FIG. 3A is a sectional view of the saw taken along line 3—3 of FIG. 2.
Figure 3B:
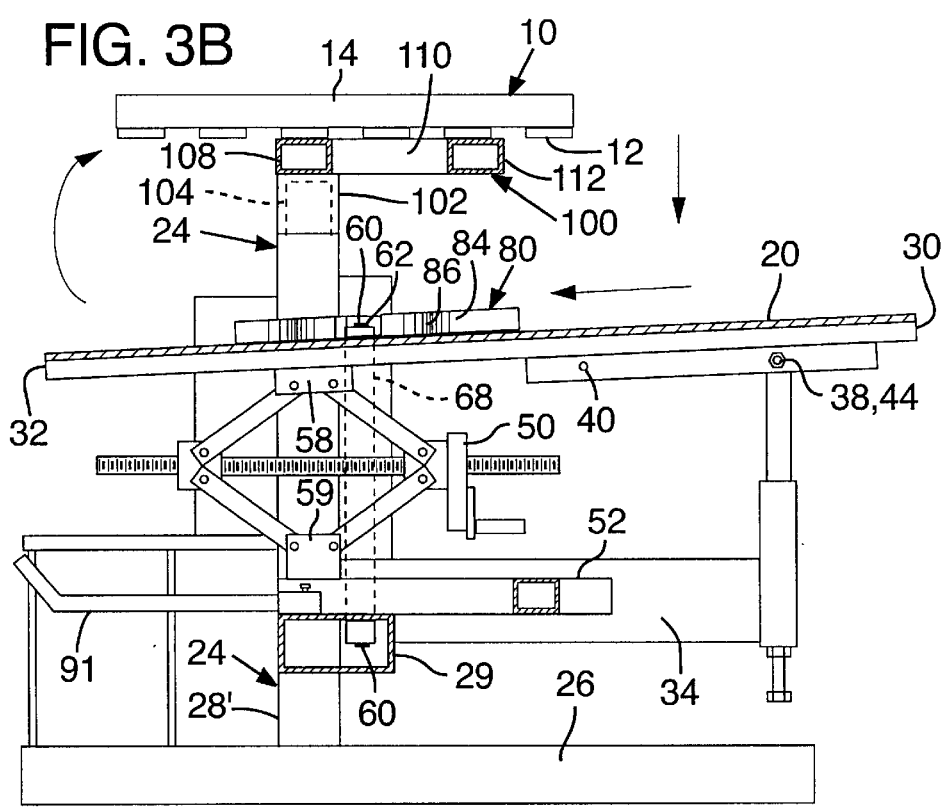
FIG. 3B is a sectional view similar to that of FIG. 3A, but showing the saw with the table moved to a position for handling of long pallets by two men.

The pallet 10 is illustrated positioned upon the upper surface of a table 20 of a saw 22 which comprises a suitable frame 24 which includes opposite base members 26, upon which are secured posts 28', 28" connected by another beam 29. Upon the posts 28', 28", most of the elements of the invention are suspended. The in-feed end of the table is designated at 30, the out-feed end at 32. Extending horizontally one from each of the posts 28', 28" is a pair of beams 34. To the distal end of each beam is secured for vertical adjustment a leg 36 to the tops of which the table 20 is pivotally secured by suitable pivot elements 38, such as bolts, for pivotal movement of the table about a horizontal axis which is parallel to the direction of movement of the saw blade (to be described). In the embodiment illustrated in FIG. 3A the pivot elements 38 extend through openings 40 (see FIG. 3B) in brackets 42, one of which brackets is secured along each of the side edges 54, 56 of the table 20. In the alternate embodiment of the invention shown in FIG. 3B, the pivot elements 38 extend through pivot openings 44 (see FIG. 3A) in the brackets 42. Since the openings 44 are closer to the in-feed end, the table in FIG. 3B is positioned forwardly relative to its position in FIG. 3A.

The table 20 is further supported by a scissor lift jack 50 slideably supported on a longitudinal beam 52 extending between the cantilevered beams 34, the lift being positioned substantially medially between the opposite side edges 54, 56 of the table 20. The jack 50 comprises an upper lift block 58 fixed to the table 20, and a lower lift block 59 freely slideable along the beam 52 when the table is adjusted between the positions shown in FIGS. 3A and 3B.

Operatively mounted upon the saw 22 is a continuous band saw blade 60 having cutting teeth 62 along one edge thereof, and supported upon sheaves 66, 68 which may be of any conventional construction. The sheave 68 is connected through any conventional drive mechanism indicated in dotted lines at 70 in FIG. 2 to a motor 72. The blade 60 is driven in a predetermined direction, in the illustrated embodiment being driven with the upper course positioned above said table and moving in the direction of the arrow 74 towards the right edge 54 of the table.

Figure 4:
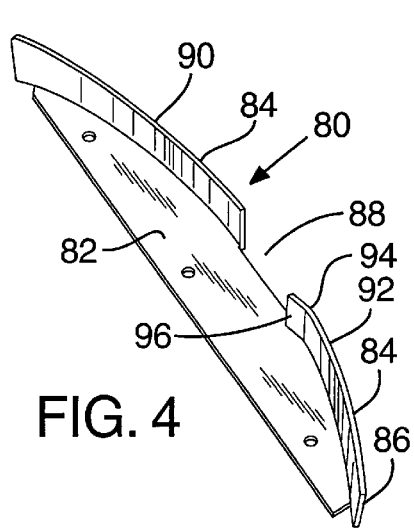
FIG. 4 is an enlarged perspective view of a fence constructed in accordance with the invention.

Secured to the upper surface of the table 20 adjacent the right edge 54 is a fence means 80 comprising a base portion 82 adapted to be bolted to the top of the table 20 along the right edge 54 of the table and an upstanding portion 84 which defines a convexly curved surface 86 facing towards the direction of movement of the saw blade 60, i.e., the cutting edge 62 of the saw blade moves toward said curved surface 86 with the apex of the curve of the surface being substantially aligned with the cutting edge 62 of the saw blade. The upstanding fence portion 84 is interrupted along its length to provide a clearance opening 88 for the blade 60, as best shown in FIGS. 1 and 4, whereby the upstanding fence portion comprises a leading portion 90 and a trailing portion 92. Preferably the leading edge 94 of the trailing portion 92 facing towards the in-feed end 30 of the table 20 is formed with a wing 96 which is inclined towards the adjacent side edge 54 of the table 20 to deflect out of the opening 88 the corner of a pallet intruding into the opening 88 and thus minimize the possibility of a pallet being moved through the saw from catching on the leading edge 94 of the trailing fence portion 92.

Figure 5:
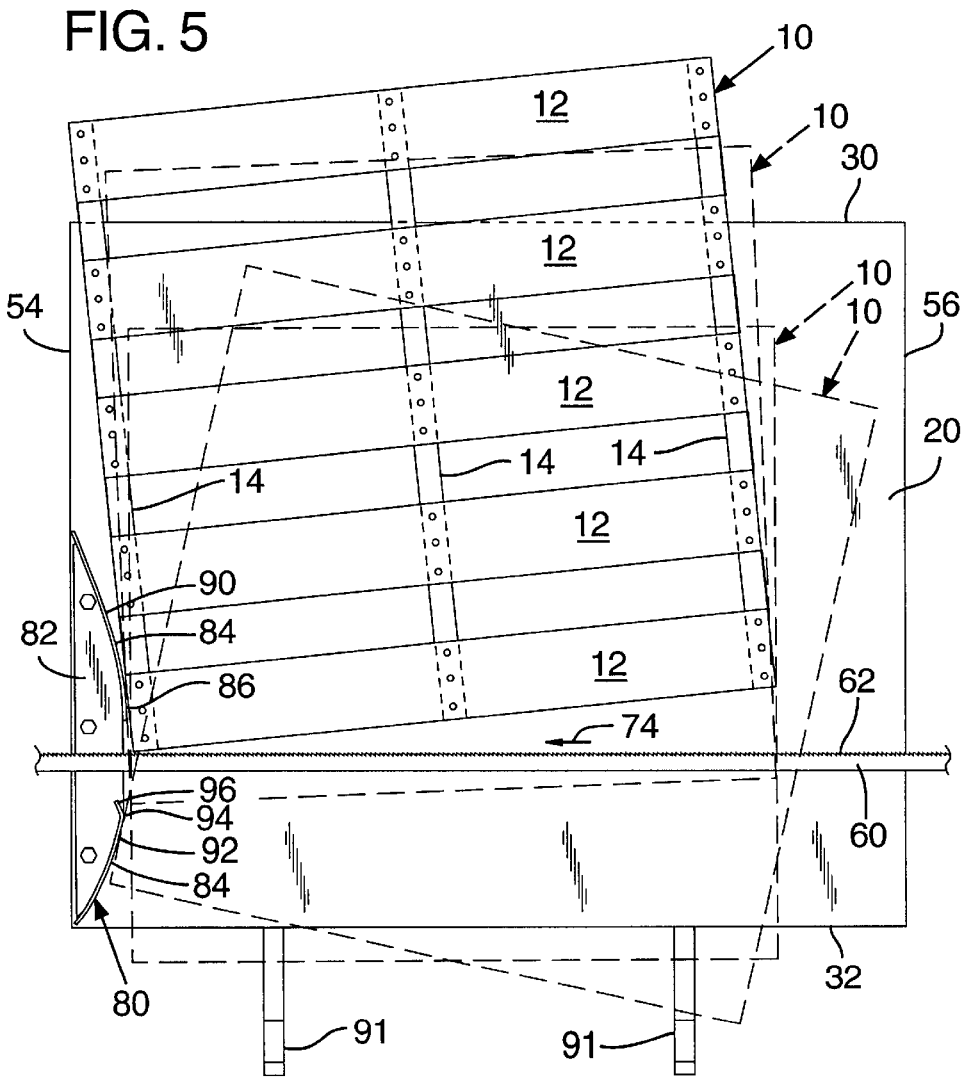
FIG. 5 is a fragmentary top plan view of the saw of FIG. 1 illustrating the utilization of the fence of FIG. 4 in the handling of pallets as they move through a saw.

As illustrated in FIG. 5, the convexly curved face 86 of the fence facilitates the maneuvering of a pallet as it is moved through a saw so as to alleviate any binding which may occur and so as to present the fasteners to be cut individually rather than several at a time to the toothed edge 62 of the saw blade. Its use substantially reduces the time required to process a pallet and reduces the stress and strain imposed on the operator(s) of the saw.

In use of the single man operating embodiment of the invention as illustrated in FIG. 1, 2, 3A and 5, a pallet is laid upon the table 20, adjacent the in-feed end 30 with the bottom face boards 12' flat on the table, and as shown in solid lines in FIG. 5, preferably with the face boards extending cross wise to the table, i.e. generally parallel to the saw blade 60.

Thereafter the pallet is pulled towards the saw blade 60 by an operator standing at the out-feed end 32 of the equipment. With the table in the position illustrated in FIG. 3A, the operator standing adjacent the out-feed end 32 of the table may comfortably reach across the saw blade 60 to grasp a pallet laying on the in-feed end to pull it toward him, and when one side is free of boards he can conveniently return the pallet to the in-feed end for its second pass. The table 20 is adjusted in height by the jack 50 so that the distance between the saw blade and the table is no less than the nominal thickness of the face boards 12, and preferably the height is just slightly greater than such thickness, say ⅟₃₂" to ⅟₁₆", so that an operator may lift slightly the pallet to be processed so that the saw blade 60 will enter at the joint between the lower face boards 12' and the lower 15 edges of the stringers 1 4. The abutting joints between the face boards and the stringers form a path of least resistance for the saw blade so that it tends to travel along such joints removing a minimum of surface material from either the face boards or the abutting edges of the stringers as it severs the holding fasteners. A single operator will first pull a pallet through the saw until all of the lower most face boards 12' on such pallet are freed by cutting the fasteners which had been holding them to the stringers 1 4. The movement of the saw blade urges the pallet against the fence 80. As indicated in FIG. 5, the convex configuration of the fence portion 84 facilitates the shifting of the pallet by the operator to facilitate severing of the nails. As the lower face boards of the pallet are severed from the stringer, they will be moved along the surface of the table by the following face boards towards the discharge edge 32 from which they fall downwardly. A pair of collecting arms 91 may be provided to collect such severed face boards for subsequent removal to some other location.

Upon completion of the removal of the bottom layer 12' of face boards, the operator may tilt the pallet on edge and flip it over the saw blade 60 and towards the in-feed end 30 of the table 20 and onto the opposite side of the pallet so that the face boards 12 rest upon the table, thereafter pulling the pallet through the saw blade by grasping the stringers and pulling the pallet towards him, again twisting the pallet upon the fence 10 80 as necessary to free any binding action. When all of the fasteners for all of the face boards are severed, the stringers and boards may be sorted and rejected or recycled depending upon their condition.

In the event that it is desired to process longer pallets which are more conveniently handled by two men than by one man alone, the table top can be shifted relative to the saw to make handling of the pallet mare convenient. Means are provided to permit the table 20 to be shifted horizontally with respect to its position relative to the saw blade 60. For this purpose, the fence 80 is unbolted from the table top and, with reference to FIGS. 3A and 3B, the table is remounted upon the legs 36 to shift its position from the position shown in FIG. 3A to that shown in FIG. 3B. To make such shift, the pivot elements 38 are removed from the bracket opening 40 and the leg openings, the table is manually moved forward to align the pivot openings 44 in the brackets 42 with the cooperating openings at the top of the legs 36, and the pivots 38 reinserted. The lower lift block 59 of the jack 50 slides upon the beam 52 sa the table is slid to its FIG. 3B position. The table height is then adjusted to its desired height relative to the saw blade 60 by adjusting the jack 50, and the fence 80 is reattached to the table in its desired position relative to the blade 60, suitable bolt openings (shown on FIG. 5) through the table being provided for that purpose.

Figure 6:
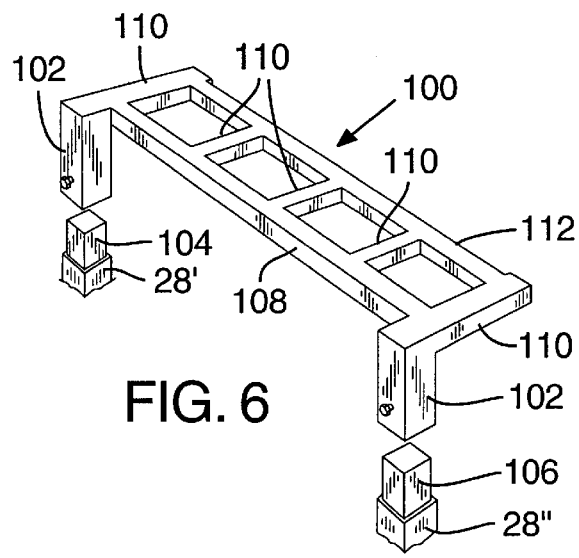
FIG. 6 is a fragmentary perspective view of the saw as shown in FIG. 3B illustrating in greater detail the bridge utilized therein.

Also, a bridge 100 may be mounted to the frame to extend over the table above the saw blade, and upon which a pallet may be slid from the discharge end 32 of the table 20 towards the in-feed end 30 after one layer of boards has been severed from the pallet so that it may be passed again through the saw blade to free the opposite layer of boards. Referring to FIG. 6, the bridge 100 comprises a pair of hollow rectangular side posts 102 sized so that one can be telescopically mounted on the top end portion 104 of the side post 28' and the other similarly upon top end 106 of the opposite side post 28". Extending between the top ends of the posts 102 is a lateral cross beam 108 to which are secured one end of a plurality of parallel, cantilevered beams 110, to the opposite ends of which is secured another lateral beam 112 which is parallel to the beam 108. The beams 108, 110, 112 all have flat top surfaces in a plane to, in effect, define a flat surface upon which the operator at the out-feed end 32 of the table 20 may slide a pallet towards the operator at the in-feed end 30 who can thereupon pull it off the bridge and onto the top of the table 20 and push the pallet towards the out-feed end of the table 20 and through the saw blade 60 to a position whereon the second operator positioned at the out-feed end of the table can comfortably grasp the stringers to pull the pallet through the saw blade 60 to complete the severance of the fasteners. The adjustment of the position of the table 20 to that shown in FIG. 3B enables the in-feed operator to be sufficiently close to the saw blade 60 so as comfortably to move the pallet towards such blade and adjust its position as necessary upon the fence 80 until the pallet is in reach of the operator at the out-feed end. As will be apparent, the apparatus may be easily returned to its one operator condition.

Having described and illustrated a preferred embodiment of the invention, it should be apparent that the invention permits of modification in arrangement in detail. I claim all such modifications as come within the scope and purview of the appended claims.

What is claimed is:

1. In a table saw for use in dismantling a wood pallet comprising a plurality of elongate, flat, parallel face boards of substantially equal length and of a predetermined thickness, a plurality of stringers extending at right angles to said face boards, said stringers being positioned one along each of the opposite ends of said face boards, and a plurality of metal fasteners extending through said face boards and into said stringers securing said face boards to said stringers and wherein said face boards define a substantially flat outer surface, said table saw comprising a frame, a table mounted on said frame, said table having a flat, substantially horizontal upper surface, and a continuous band saw blade having a cutting edge, saw blade supporting means mounted on said frame and supporting said saw blade with an upper course extending across and above said table upper surface, and a lower course positioned beneath said table, motor means operatively arranged with said saw for driving said upper course of said blade in a predetermined direction of movement across said table surface, and fence means mounted on said table upper surface extending substantially normal to the direction of movement of said saw blade upper course, said fence means comprising a first portion defining a convexly curved surface facing towards said saw blade direction of movement, with the apex of said curved surface being substantially aligned with the cutting edge of said saw blade.

2. A table saw as set forth in claim 1 wherein said convexly curved surface has an opening spanning said apex for receiving said saw blade.

3. A table saw as set forth in claim 2 wherein said fence means first portion has a leading portion and a trailing portion defining said opening, said trailing portion including a wing inclined away from the direction of movement of said blade.

4. A table saw as set forth in claim 1 wherein said table saw comprises means on said frame supporting said table for movement of said table between at least two fixed positions in a direction at right angles to said direction of movement of said saw blade.

5. A table saw as set forth in claim 1, wherein said table is pivotally mounted to said frame for pivotal movement about an axis parallel to the direction of movement of said saw blade upper course across said table surface, and table height adjusting means operatively arranged between said frame and table for effecting pivotal movement of said table about said axis so as to adjust the vertical height of said table relative to said saw blade upper course.

6. A table saw as set forth in claim 5 wherein said table height adjusting means comprises a jack.

\* \* \* \* \*